May 20, 1958     K. A. HÄUSSERMANN     2,835,366
FRICTION CLUTCH, ESPECIALLY FOR MOTOR VEHICLES
Filed Jan. 18, 1954     5 Sheets—Sheet 2
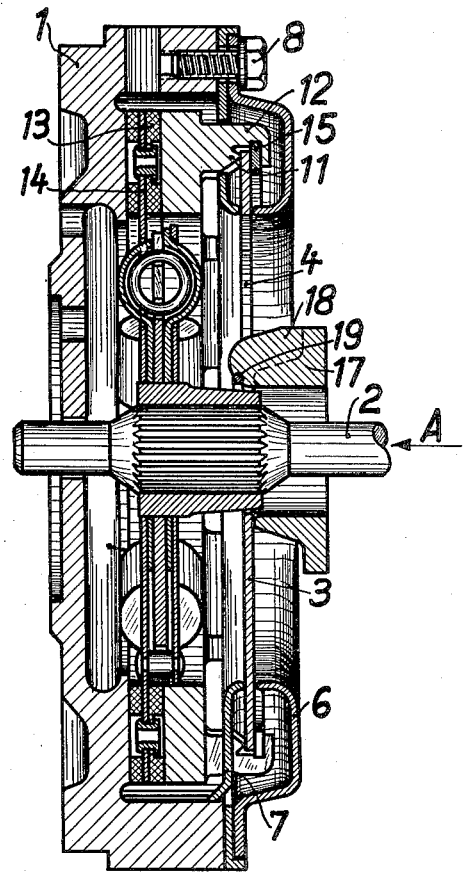
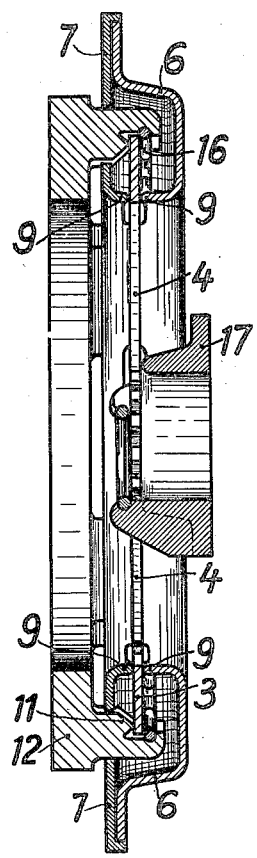
INVENTOR:
Kurt A. Häussermann
By
Patent Agent.

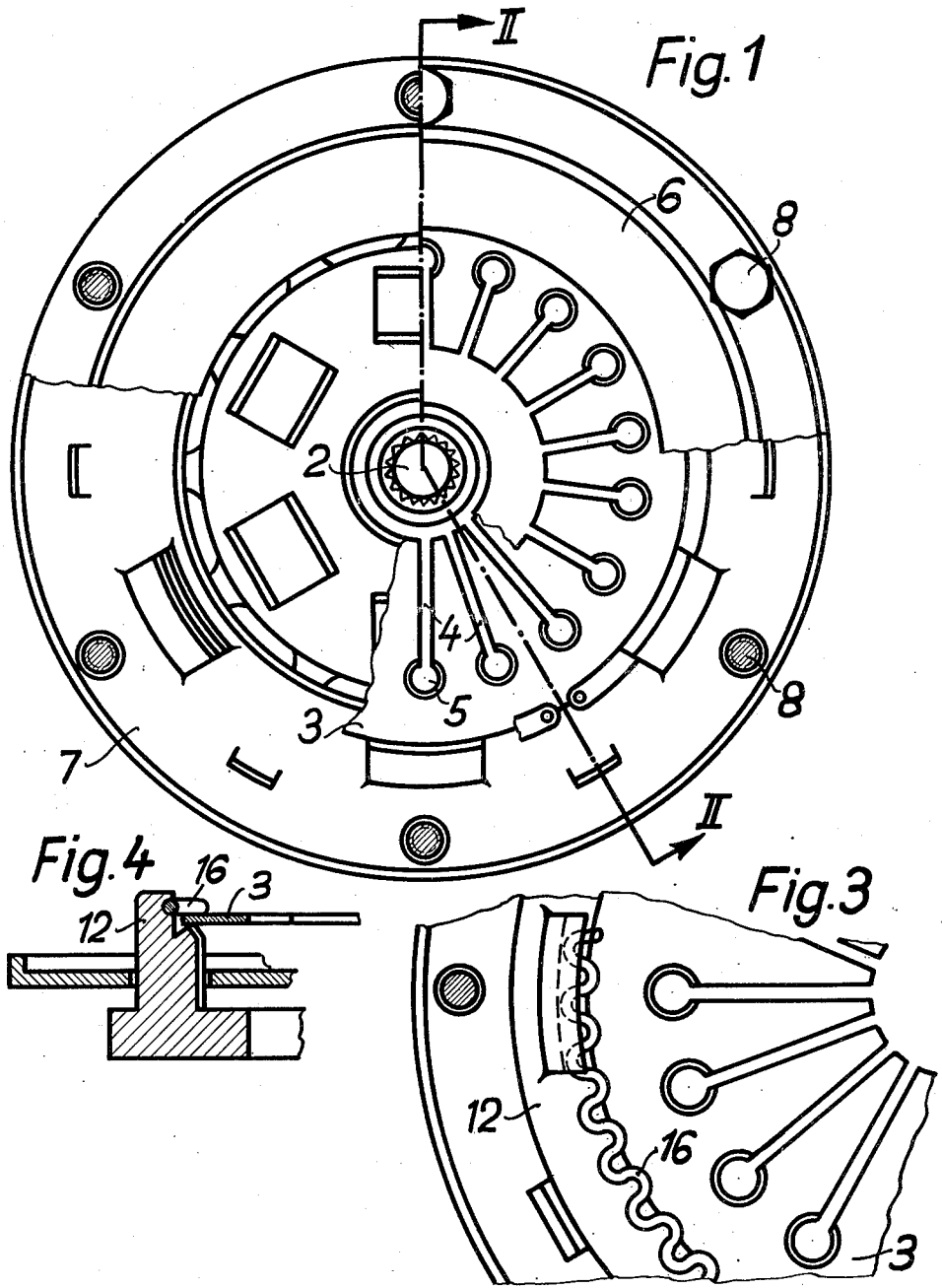

May 20, 1958 K. A. HÄUSSERMANN 2,835,366
FRICTION CLUTCH, ESPECIALLY FOR MOTOR VEHICLES
Filed Jan. 18, 1954 5 Sheets-Sheet 3

INVENTOR:
Kurt A. Häussermann
By
Patent Agent

May 20, 1958 K. A. HÄUSSERMANN 2,835,366
FRICTION CLUTCH, ESPECIALLY FOR MOTOR VEHICLES
Filed Jan. 18, 1954 5 Sheets-Sheet 4

INVENTOR:
Kurt A. Häussermann
By [signature]
Patent Agent

May 20, 1958     K. A. HÄUSSERMANN     2,835,366
FRICTION CLUTCH, ESPECIALLY FOR MOTOR VEHICLES
Filed Jan. 18, 1954     5 Sheets-Sheet 5
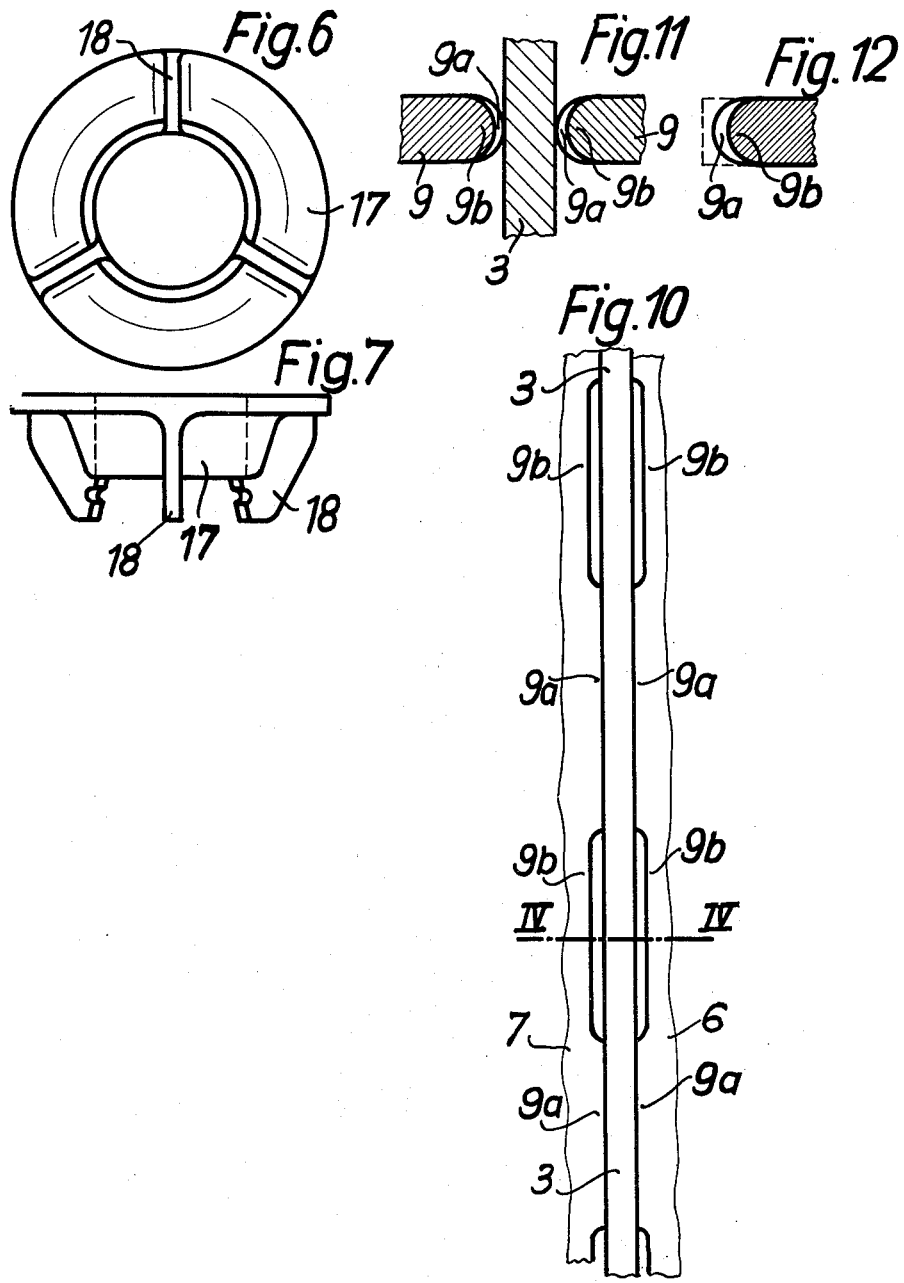
INVENTOR
Kurt A. Häussermann
By Walter Becker
Patent Agent

United States Patent Office 2,835,366
Patented May 20, 1958

2,835,366

FRICTION CLUTCH, ESPECIALLY FOR MOTOR VEHICLES

Kurt A. Häussermann, Stuttgart, Germany, assignor to Lamellen- und Kupplungsbau August Häussermann, Stuttgart-Oberturkheim, Germany Application January 18, 1954, Serial No. 404,495

Claims priority, application Germany October 28, 1953

13 Claims. (Cl. 192—68)

The present invention relates to friction clutches, especially for use in motor vehicles. Friction clutches, particularly for motor vehicles are known, according to which a spring disc is employed as clutch spring which spring disc, when not under load, is cone-shaped, and is inserted into the clutch under load. The outer circumference of the spring disc thus exerts coupling pressure upon a pressure plate, which coupling pressure is released during the de-clutching operation by action upon the central portion of the spring disc. The heretofore known clutches of this type are provided with abutment means of circular cross section arranged at both sides of the disc. These abutment means are preferably formed by wire rings which comprise bolts riveted to the clutch cover and other supporting means, said spring disc resting on one hand against the clutch cover and on the other hand against a flange of said bolts, while said abutment means or wire rings act as roller bearings for the lever movement of the individual sectors of said spring disc.

Other heretofore known clutches of a similar type are, for purposes of connecting the spring disc, provided with tongues which are bent out of the clutch cover and hold the wire rings.

With another type of clutches, the wire rings are replaced by annular beads which on one hand are pressed into the clutch cover and on the other hand are designed as marginal bead of a special ring which is held by tongues bent out of the cover.

All of these clutches require relatively many connecting and holding members which complicates the design and the assembly and represents a source of disturbances.

It is, therefore, an object of the present invention to provide a friction clutch which will overcome the above mentioned drawbacks.

It is another object of this invention to provide a friction clutch making use of a clutch spring of the Belleville type which will be superior to heretofore known clutches of this type with regard to efficiency, durability, ease of operation and low cost of manufacture.

Still another object relates to the improved details in the assembly of the parts of such a clutch employing the Belleville spring.

These and other objects and advantages of the invention will appear more clearly from the following specification in connection with the accompanying drawings in which:

Fig. 1 is a front view of a clutch according to the present invention seen in the direction of the arrow A of Fig. 2, a portion of the casing and also a portion of the spring of the Belleville type being omitted.

Fig. 2 represents a section taken along the line II—II of Fig. 1.

Fig. 3 is a partial view of a modified manner of connecting the clutch spring.

Fig. 4 is a partial axial section of the arrangement shown in Fig. 3.

Fig. 6 is a view of the de-clutching ring seen in the direction opposite to the arrow A.

Fig. 7 is a side view of Fig. 6.

Fig. 9 is an axial section through the two casing portions with clutch spring, pressure plate and de-clutching ring.

Fig. 10 illustrates on a somewhat larger scale a partial view of the clutch spring with the supporting surfaces thereof.

Fig. 11 represents a section along the line XI—XI of Fig. 10.

Fig. 12 illustrates the formation of the abutment or supporting edges of a portion of the casing.

*General arrangement*

The drawbacks of heretofore known friction clutches as outlined in the introductory portion of this specification have been overcome according to the present invention by connecting two casing portions with the fly-wheel disc and to cause said two casing portions to hold therebetween the spring disc while the supporting surface of said casing portions form abutment means under tension for the spring so that when the inner circumference of said spring is subjected to pressure, the pressure plate will immediately be lifted off. The actual portions of the casing portions which form the abutment means for the spring disc may be tapered edge-like and may engage corresponding grooves of the spring disc. However, if desired the abutment surfaces of the casing portions for engagement with the spring disc may also be plane so that due to the holding pressure and the abutment surfaces the spring disc will be secured against displacement. The outer marginal area of the spring disc may be connected to the pressure plate by means of a spring ring or through a resilient serpentine-like shaped wire ring which under tension engages a recess in the pressure plate.

According to a further development of the invention, the abutment surfaces for the disc spring may consist of individual spaced short abutment means which are separated from each other by recessed portions of the bent-out supporting marginal areas of the two casing portions. In this way a less tight clamping in of the spring disc and thus a greater flexibility of the clutch is obtained.

The distribution of the above mentioned abutment or supporting surfaces at the marginal areas of the two casing portions and the recesses arranged therebetween may be selected in conformity with the special requirements to be met by the clutch. The elevations and depressions near the two margins may be arranged opposite to each other or may be offset with regard to each other. The supporting or abutment surfaces may be arranged along the radial axis of the slots in the spring disc and the bores at the end of said slots or also between said radial axes. In this way the characteristic of the individual spring discs may be taken into consideration.

The supporting margins or edges of the two casting portions are preferably designed with a square basic cross section which by compression is somewhat shortened and solidified so that at the same time a rounded-off shape is created and in a single working step the said supporting surfaces can be formed as well as the depression therebetweeen. The element for disengaging the coupling, which element is arranged in the central portion of the clutch, is preferably formed by an annular cast body which by means of individual ribs engages the slots of the spring disc and in appropriate manner for instance by a spring ring is safeguarded against being pulled out of the spring disc.

*Structural arrangement*

Figure 13:
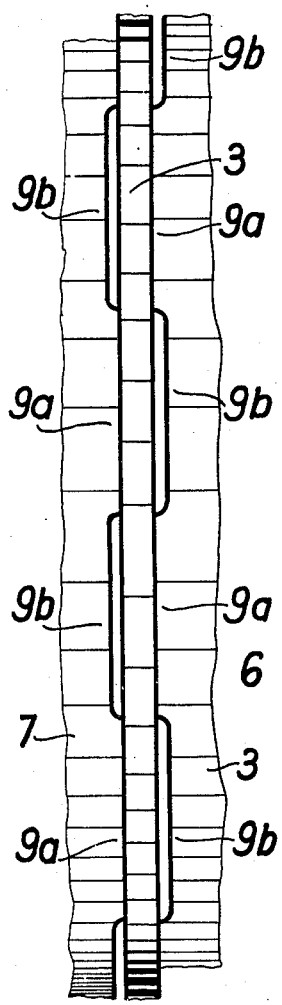
Figs. 13 and 14 are further modifications of details of the clutch according to the invention.
Figure 14:
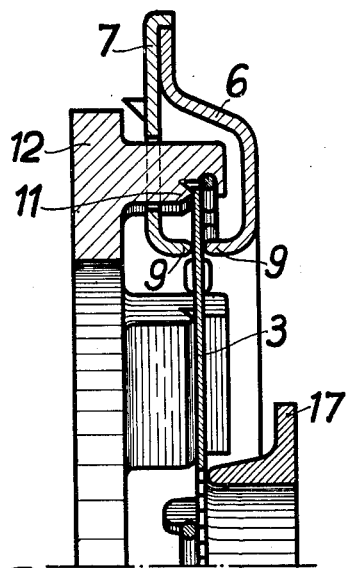
Figure 2A:
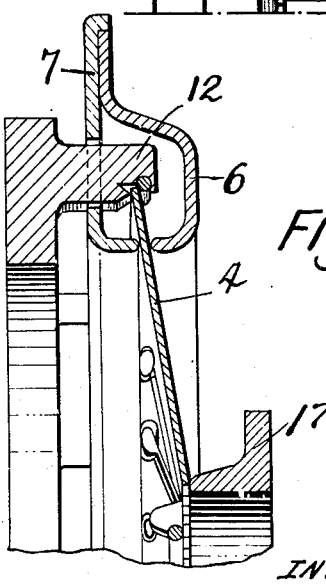
Fig. 2a shows the clutch spring position when the clutch is engaged.
Figure 8:
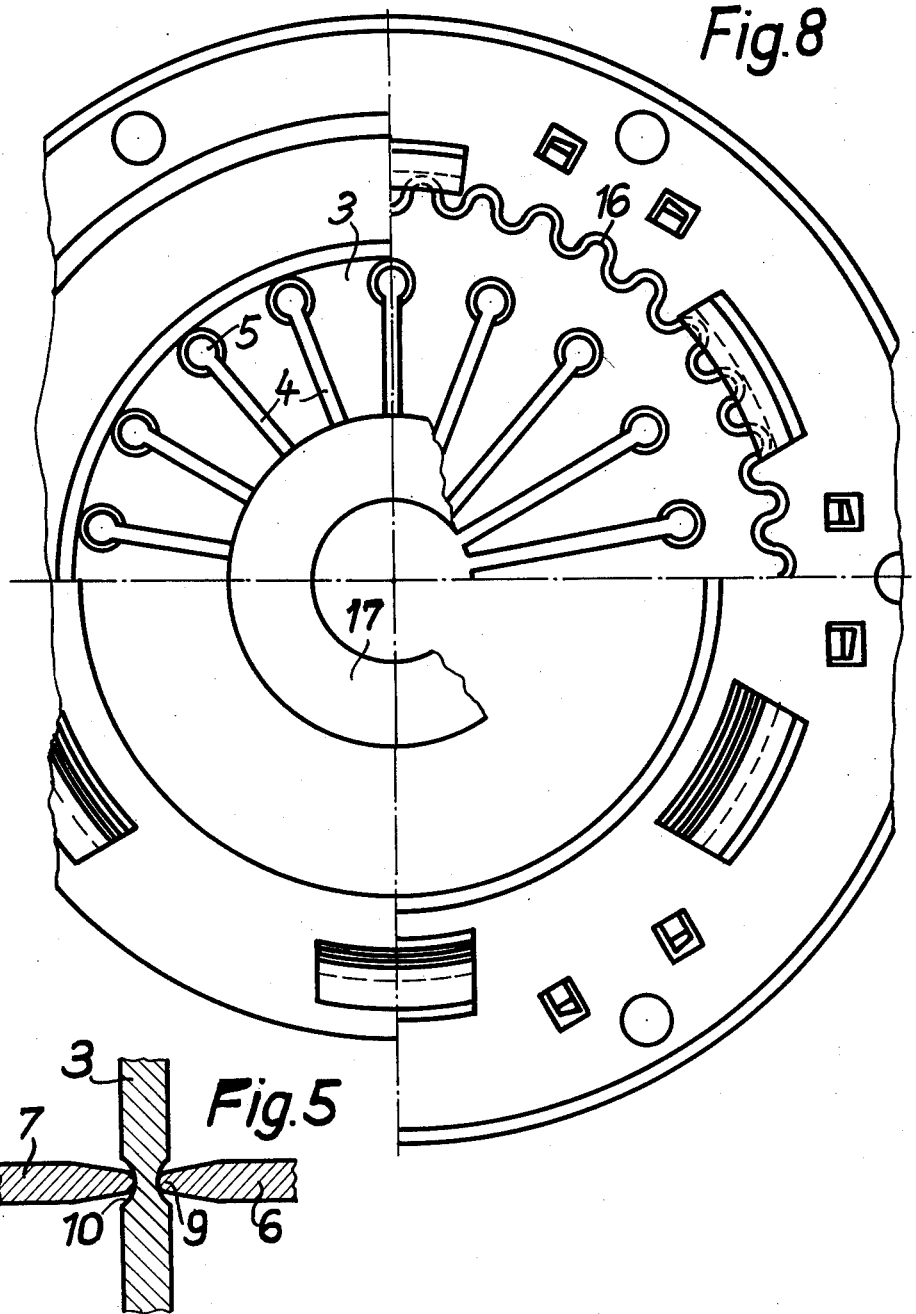
Fig. 8 is a front view of a clutch with individual separate abutments for the clutch spring, a portion of the casing and of the spring being omitted.

Referring now to the drawings in detail and Figs. 1 and 2 thereof in particular, the clutch shown therein comprises a fly-wheel 1 which in a manner known per se is connected with the motor shaft (not shown in the drawing). The clutch furthermore comprises a shaft 2 adapted to be clutched to the motor shaft, which shaft 2 may for instance be the transmission shaft of a motor vehicle transmission. The clutch also comprises a spring disc 3 which in a manner known per se is provided with radial slots 4 extending radially outwardly and ending in circular recesses 5 within the spring disc.

Figure 5:
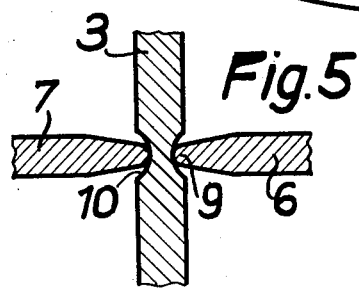
Fig. 5 shows on a somewhat larger scale than that employed in Figs. 1 to 4 an embodiment for assembling the clutch spring.

For holding the spring disc in clamped-in condition and to form abutment means for said spring disc, the clutch casing according to the present invention comprises two casing portions 6 and 7 which for instance by screws 8 are connected to the fly-wheel 1 and which are interconnected by screws or by spot welding, flanging or the like. The abutment surfaces of the casing parts 6 and 7 which serve as abutment for the spring disc are bent in such a manner that said casing parts 6 and 7 are under tension or preload so that, when the clutch is to be engaged the casing portion 6 aids the disengaging pressure upon the pressure ring 17, whereas when the clutch is to be engaged, the casing part 7 aids the Belleville spring to return to its normal position. These surfaces acting upon the spring disc may, as mentioned above, be plane in which instance the spring disc is held against displacement by the holding pressure and the said surfaces. The abutment means or bearings 9 may, however, also be tapered edge-like as shown in Fig. 5 and by means of these edges may engage stamped-out grooves 10 arranged on both sides of the spring disc 3 to thereby prevent the spring disc 3 from accidental displacement. The outer marginal area or edge of the spring disc rests upon an annular protruding portion of the pressure plate 12 which latter in its turn may in a manner known per se through conventional friction facings 13 be brought into operative engagement with the disc 14. When lifting off the pressure plate by pressing in the spring disc, the marginal area of said spring disc rests against a spring ring 15 inserted into the pressure plate.

According to Figs. 3 and 4, the said spring ring is replaced by a corresponding annular recess in the pressure plate and a serpentine-shaped wire ring arranged in said annular recess whereby likewise a lifting off of the pressure plate 12 will be effected.

The pressure ring 17 which serves for lifting off the pressure plate may be in the form of a cast piece which is provided with individual protruding ribs 18 engaging slots 4 of the spring disc. By means of a spring ring 19, the said pressure ring is prevented from being accidentally pulled out from the respective slots of the spring disc.

According to the embodiments shown in Figs. 8 to 12, the two casing parts 6 and 7 are likewise interconnected by flanging so as to form a stable box-like casing which is highly resistant against twist and distortion and which similar to the manner described above are connected to the fly-wheel.

The edges 9' of the two casing parts which serve as abutments for the spring disc 3 are offset at equal distances so that they form protruding portions 9a and receding portions 9b of which only the portions 9a serve as supporting surfaces for the spring disc. The edges are shaped from an originally rectangular sheet metal cross section into the desired arched form shown in Fig. 12 by pressing in and consolidating the material. The outer marginal area of the spring disc rests on an annular protruding portion 11 of the pressure plate 12. By pressing in the de-clutching ring 17, the marginal area of the spring disc is lifted off somewhat and thereby through the intervention of the serpentine-shaped wire ring 16 lifts off the pressure plate 12 as the result of which the friction clutch (not shown in the drawing) is disengaged in the same manner as described above.

It is, of course, understood that the present invention is, by no means, limited to the particular constructions shown in the drawings but also comprises any modifications within the scope of the appended claims.

What I claim is:

1. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, a Belleville type spring engaging said pressure plate and operable to actuate the same, a pair of annular members confining with each other an annular chamber and being supported by said fly-wheel, the inner edge portions of said annular members being bent toward each other so as to define passage means therebetween having a width slightly wider than the thickness of said Belleville type spring, the marginal portion of said spring extending through said passage means and having opposite sides engaged by tapered rounded ends of said bent inner edge portions, those marginal portions of said Belleville type spring which are engaged by said tapered rounded ends being grooved, and pressure exerting means operable to exert pressure upon the central portion of said spring to thereby cause the outer marginal portion of said spring to pivot about the inner edge of one of said annular members for moving said pressure plate away from said fly-wheel.

2. In a clutch: a fly-wheel, a pressure plate, friction disc means interposed between said fly-wheel and said pressure plate and adapted to be pressed by said pressure plate against said fly-wheel, a driven shaft connected to said friction disc means, spring disc means arranged substantially coaxially with regard to said pressure plate, a serpentine resilient wire ring interposed between said pressure plate and the outer marginal area of said spring disc means to thereby convey pressure from said spring disc means to said pressure plate for actuating the latter, said pressure plate being provided with cutouts and said resilient wire ring engaging said cutouts under load and forming grooves therewith arranged along a circle, said grooves housing the peripheral portion of said spring disc means and forming the only support therefor, a pair of annular members confining with each other an annular chamber and being supported by said fly-wheel, the inner edge portions of said annular members being bent toward each other so as to define passage means therebetween and being arranged for engagement with both sides of the outer marginal portion of said spring, said passage means having a width slightly wider than the thickness of said Belleville type spring, and pressure exerting means operable to exert pressure upon the central portion of said spring to thereby cause the outer marginal portion of said spring to pivot about the inner edge of one of said annular members for moving said pressure plate away from said fly-wheel.

3. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, said pressure plate being provided with cut-outs arranged along a circle substantially coaxial with said pressure plate, a Belleville type spring engaging the cut-outs of said pressure plate and operable to actuate the same, a resilient wire ring suported by said pressure plate and confing with said cut-outs the peripheral portion of said Belleville type spring, said spring being supported in said cut-outs only and being provided with radial slots, a pair of annular members confining with each other an annular chamber and being supported by said fly-wheel, the inner edge portions of said annular members being bent toward each other so as to define passage means therebetween and being arranged for engagement with both sides of the outer marginal portion of said spring, said passage means having a width slightly wider than the thickness of said Belleville type spring, and an annular pressure body operable to exert pressure upon the central portion of said spring to thereby cause the outer marginal portion of said spring to pivot about the inner edge of one of said annular members for moving said pressure plate away from said fly-wheel, said annular pressure body being provided with radial arms extending through said radial slots.

4. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, means on said pressure plate defining a circular path substantially coaxial with said pressure plate, a Belleville-type spring engaging said pressure plate and positioned within said circular path with the peripheral portion of one face engaging said last mentioned means, an annular spring engaging the said last-mentioned means and the peripheral portion of the other face of said Belleville-type spring thereby confining and supporting said Belleville-type spring on said pressure plate, a pair of annular members defining with each other an annular chamber and being supported by said fly-wheel, the inner edge portions of said annular members being bent toward each other so as to allow the insertion of the outer marginal portion of said spring therebetween into said annular chamber, the bent inner edge portions of each annular member being interrupted by spaced circularly arranged bent-out sections and engaging the marginal portion of said spring from both sides thereof, and pressure exerting means operable to exert pressure upon the central portion of said spring to thereby cause the outer marginal portion of said spring to pivot about the inner spaced edge sections of one of said annular members for moving said pressure plate away from said fly-wheel.

5. A clutch according to claim 4, in which the inner spaced edge sections of said annular members are located substantially opposite each other.

6. A clutch according to claim 4, in which the inner spaced edge sections of one of said annular members are offset with regard to the inner spaced edge sections of the other annular member.

7. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, means on said pressure plate defining a circular path substantially coaxial with said pressure plate, a Belleville-type spring engaging said pressure plate and positioned within said circular path with the peripheral portion of one face engaging said last mentioned means, an annular spring engaging the said last-mentioned means and the peripheral portion of the other face of said Belleville-type spring thereby confining and supporting said Belleville-type spring on said pressure plate, said spring being provided with radial slots, a pair of annular members defining with each other an annular chamber and being supported by said fly-wheel, the inner edge portions of said annular members being bent toward each other so as to allow the insertion of the outer marginal portion of said spring therebetween into said annular chamber, the bent inner edge portions of each annular member being interrupted by spaced circularly arranged bent-out sections and engaging the marginal portion of said spring from both sides thereof to form bearing sections for said spring, the axes of said bearing sections being at least approximately aligned with the axes of said radial slots, and pressure exerting means operable to exert pressure upon the central portion of said spring to thereby cause the outer marginal portion of said spring to pivot about the bearing sections of one of said annular members for moving said pressure plate away from said fly-wheel.

8. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, means on said pressure plate defining a circular path substantially coaxial with said pressure plate, a Belleville-type spring engaging said pressure plate and positioned within said circular path with the peripheral portion of one face engaging said last mentioned means, an annular spring engaging the said last-mentioned means and the peripheral portion of the other face of said Belleville-type spring thereby confining and supporting said Belleville-type spring on said pressure plate, said spring being provided with radial slots, a pair of annular members defining with each other an annular chamber and being supported by said fly-wheel, the inner edge portions of said annular members being bent toward each other so as to allow the insertion of the outer marginal portion of said spring therebetween into said annular chamber, the bent inner edge portions of each annular member being interrupted by spaced circularly arranged bent-out sections and engaging the marginal portion of said spring from both sides thereof to form bearing sections for said spring, said bearing sections being located between the axes of said radial slots, and pressure exerting means operable to exert pressure upon the central portion of said spring to thereby cause the outer marginal portion of said spring to pivot about the bearing sections of one of said annular members for moving said pressure plate away from said fly-wheel.

9. In a clutch: a fly-wheel, a driven shaft substantially co-axially arranged with regard to said fly-wheel, friction disc means supported by said shaft for frictional engagement with said fly-wheel, a pressure plate operable to press said friction disc means against said fly-wheel, means on said pressure plate defining a circular path substantially coaxial with said pressure plate, a Belleville-type spring engaging said pressure plate and positioned within said circular path with the peripheral portion of one face engaging said last mentioned means, an annular spring engaging the said last-mentioned means and the peripheral portion of the other face of said Belleville-type spring thereby confining and supporting said Belleville-type spring on said pressure plate, a pair of annular members supported by said fly-wheel and defining with each other an annular chamber surrounding a portion of said pressure plate, the inner edge portions of said annular members being bent toward each other to allow passage of the outer marginal area of said spring disc therebetween for engagement with that portion of said pressure plate which is located within said annular chamber, the bent inner edge portions of said annular members having alternately protruding and receding rounded sections with the protruding sections only engaging the adjacent outer marginal surfaces of said spring disc, and pressure exerting means operable to exert pressure upon the central portion of said spring disc to thereby cause the outer marginal portion of said spring disc to pivot about the protruding edge sections of one of said annular members for moving said pressure plate away from said fly-wheel.

10. In a clutch having a fly-wheel, a pressure plate with circularly spaced flanged portions, and friction disc means interposed between said fly-wheel and said pressure plate and adapted to be pressed against said fly-wheel by said pressure plate, the combination of: spring disc means arranged substantially coaxially with regard to said pressure plate and extending up to said flanged portions so as to have its outer marginal portion engaged thereby, an annular disc having its outer marginal portion connected to said fly-wheel and having its inner marginal portion bent toward said spring disc in spaced relationship to said flanged portions for engagement with one side of said spring disc, said annular disc being provided with circularly spaced passages through which said flanged portions extend, an annular cover member having its outer marginal portion connected to the outer marginal portion of said annular disc and having its inner marginal portion bent inwardly in spaced relationship to said marginal portions for engagement with the other side of said spring disc, and pressure exerting means operable to exert pressure upon the central portion of said spring disc to thereby cause the outer marginal portion of said spring disc to pivot about the inner edge of one of said bent portions engaging said spring disc.

11. A clutch according to claim 3, which includes a spring ring, and in which the radial arms of said annular pressure body contain a groove engaged by said spring ring, said spring ring overlying and engaging the inner marginal portion of said Belleville type spring thereby preventing said annular pressure body from accidentally leaving said Belleville type spring.

12. In combinaton in a clutch: a fly-wheel, a pressure plate with circularly flanged portions, friction disc means interposed between said fly-wheel and said pressure plate and adapted to be pressed against said fly-wheel by said pressure plate, annular spring means supported by said flanged portions and confining therewith grooves arranged along a circle substantially concentric with said pressure plate, a disc spring having its outer marginal portion arranged in said groove and being supported in said groove only while said annular spring means continuously presses said marginal portion against said flanged portions, the bottom of said grooves limiting any movement of said disc spring in a plane perpendicular to the axis of rotation of said pressure plate so as to hold said disc spring in substantially concentric position with regard to said pressure plate, abutment means supported by said pressure plate and engaging said disc spring on opposite sides thereof in radially spaced relationship to said grooves, and pressure exerting means operable to exert pressure upon the central portion of said disc spring to thereby cause the outer marginal portion of said disc spring to pivot about one of said abutment means.

13. A clutch according to claim 12, in which said annular spring means is of serpentine shape.

References Cited in the file of this patent

UNITED STATES PATENTS

| 1,874,268 | Fink | Aug. 30, 1932 |
| 1,939,888 | Fink | Dec. 19, 1933 |
| 2,064,499 | Spase | Dec. 15, 1936 |
| 2,222,508 | Hunt | Nov. 19, 1940 |
| 2,256,708 | Geyer et al. | Sept. 23, 1941 |
| 2,380,677 | Schjolin | July 31, 1945 |

FOREIGN PATENTS

| 368,537 | Great Britain | Mar. 10, 1932 |